(12) United States Patent
Abels

(10) Patent No.: US 6,913,409 B2
(45) Date of Patent: Jul. 5, 2005

(54) BALL JOINT FOR MOTOR VEHICLES

(75) Inventor: Olaf Abels, Belm (DE)

(73) Assignee: ZF Lemförder Metallwaren AG, Stemwede-Dielingen (DE)

( * ) Notice: Subject to any disclaimer, the term of this patent is extended or adjusted under 35 U.S.C. 154(b) by 0 days.

(21) Appl. No.: 10/399,207

(22) PCT Filed: Oct. 17, 2002

(86) PCT No.: PCT/DE02/03924

§ 371 (c)(1),
(2), (4) Date: Apr. 14, 2003

(87) PCT Pub. No.: WO03/036108

PCT Pub. Date: May 1, 2003

(65) Prior Publication Data

US 2004/0096264 A1 May 20, 2004

(30) Foreign Application Priority Data

Oct. 17, 2001 (DE) ..................................... 201 16 794 U

(51) Int. Cl.[7] ................................................ F16C 11/00
(52) U.S. Cl. ........................ 403/134; 403/50; 403/122; 403/135
(58) Field of Search ....................... 280/93, 51, 93.511; 403/50, 51, 76, 122, 127, 140, 132–135

(56) References Cited

U.S. PATENT DOCUMENTS

| 3,208,779 | A | 9/1965 | Sullivan, Jr. |
| 3,472,540 | A | 10/1969 | Gottschald |
| 5,092,704 | A | 3/1992 | Buhl et al. |
| 6,357,956 | B1 * | 3/2002 | Zebolsky et al. ........... 403/134 |

FOREIGN PATENT DOCUMENTS

| CH | 465 971 | 1/1969 |
| DE | 198 50 378 | 3/2000 |
| EP | 1 052 418 | 11/2000 |

* cited by examiner

*Primary Examiner*—David Bagnell
*Assistant Examiner*—Michael P. Ferguson
(74) *Attorney, Agent, or Firm*—McGlew and Tuttle, P.C.

(57) ABSTRACT

A ball-and-socket joint for motor vehicles has a ball pivot with at least a joint ball (4) accommodated rotatably and/or pivotably in a bearing shell (2) of a housing (3) and a pivot section (5). A sealing bellows is provided with a first edge area (7) fastened to the housing (3) and withe a second edge area (8) has a sliding connection with a thrust ring (9), which is fixed on the pivot section (5) and comprises an axial shoulder (10) and a radial shoulder (11), wherein the radial shoulder (11) of the thrust ring (9) forms a wave-shaped contour.

20 Claims, 3 Drawing Sheets

BALL JOINT FOR MOTOR VEHICLES

FIELD OF THE INVENTION

The present invention pertains to a ball-and-socket joint for motor vehicles, which has a ball pivot, which comprises at least a joint ball accommodated rotatably and/or pivotably in a bearing shell of a housing and a pivot section. In addition, the inner joint components of the ball-and-socket joint are protected from the penetration of contaminants and moisture by a sealing bellows. The sealing bellows of ball-and-socket joints of this type has a first edge area, which is fastened to the housing. A second edge area of the sealing bellows is connected via a sliding connection with a thrust ring fixed on the pivot section of the ball pivot. The thrust ring has an axial shoulder as well as a radial shoulder arranged at an angle thereto. Such a ball-and-socket joint for motor vehicles is shown, e.g., in CH 465 971. While the first edge area of the sealing bellows is fastened to the housing of the ball-and-socket joint by at least one straining ring, the second edge area has a sliding connection with the thrust ring. This sliding connection is necessary in the prior-art design especially to make possible a relative movement between the sealing bellows and the ball pivot during rotary movements of the ball pivot around its longitudinal axis. Without such a mobility, the sealing bellows, which usually consists of rubber, would be unduly stressed and wear off prematurely, because tensile loads may exert a damaging effect on the rubber. The service life of such a ball-and-socket joint would be consequently reduced. Since ball-and-socket joints for wheel suspensions in motor vehicles are frequently arranged in the area close to the wheel, as is the case of supporting joints or guiding joints, they are extremely stressed, e.g., by oils, greases, dirt, splash water and corrosive media, such as salt solutions, and especially high requirements must therefore be imposed on the sealing of the ball-and-socket joints.

BACKGROUND OF THE INVENTION

As was mentioned in the introduction, it is beneficial for compensating the rotary movements of the ball-and-socket joint to provide thrust rings for one of the edges of the sealing bellows. However, there is an additional hazard potential for the joint components in the case of the use of thrust rings, because the migration of moisture or corrosive media under these thrust rings, e.g., by creeping, would lead to the possibility of the development of corrosion phenomena especially in the thrust ring area of such ball-and-socket joints, which would ultimately lead to a reduced service life of the ball-and-socket joint because the joint components are subject to more rapid wear due to the corrosion in the contact area than is desired, and thus it would no longer be possible to prevent moisture and contaminants for penetrating into the sensitive joint components in the interior of the ball-and-socket joint. Additional sealing measures taken in the contact area between the thrust ring and the ball pivot also fail to rule out this risk completely. Increased requirements are imposed on the sealing of affected assembly units especially by the cleaning with high-pressure cleaning devices.

SUMMARY OF THE INVENTION

The basic technical object of the present invention is to develop a ball-and-socket joint that offers improved protection for the sensitive joint components against contaminants, splash water or corrosive effects.

According to the invention, a ball-and-socket joint is provided for motor vehicles. The ball-and-socket joint has a ball pivot with at least a joint ball accommodated rotatably and/or pivotably in a bearing shell of a housing and a pivot section. A sealing bellows is provided with a first edge area fastened to the housing and with a second edge area having a sliding connection with a thrust ring. The thrust ring is fixed on the pivot section and comprises an axial shoulder and a radial shoulder. The radial shoulder of the thrust ring forms a wave contour.

A very simple and consequently inexpensive variant was created by such a design of a ball-and-socket joint, which effectively protects the ball-and-socket joint and thus increases, on the whole, its service life. Additional complicated sealing measures for the critical sections of the thrust ring are avoidable. A ball-and-socket joint according to the present invention is characterized by excellent resistance to splash water and corrosion.

Corresponding to one embodiment of the present invention, the radial shoulder should be elastically supported against the surface of a motor vehicle component in the installed state of the ball-and-socket joint in the motor vehicle. As a result, increasing sealing is achieved between the thrust ring and the adjacent motor vehicle component, which may be, e.g., a lever eye of a wheel carrier, during the installation of the ball-and-socket joint in the motor vehicle.

The thrust ring is advantageously designed such that when viewed in the radial direction, i.e., beginning from the axial shoulder, its radial shoulder first has a first wave peak, a wave valley following it and a second wave peak following the latter. The inherent elasticity of the material of the thrust ring is increased by such a design.

It proved to be useful especially for the elasticity of the radial shoulder for the wave peaks to have different heights in relation to a common plane, and the first wave peak should preferably have a greater height than the second wave peak. The contact with the associated motor vehicle component can thus be improved. Furthermore, the deformation of the thrust ring is definable and the risk for the radially outer edge area of the thrust ring lifting off from the motor vehicle component can be eliminated, which means a reliable, secure contact and consequently sealing in this area.

To avoid corrosion and consequently premature wear of the sensitive sealing area, the thrust ring should be made of a corrosion-resistant material, and it may preferably consist of special steel.

Moreover, additional measures may be provided to optimize the sealing system of the ball-and-socket joint. Thus, it is possible in the sense of the present invention to provide the second edge area of the sealing bellows with a labyrinth seal on at least one of its contact surfaces with the thrust ring. Furthermore, the contact of the edge area of the sealing bellows in the thrust ring can be improved by means of a prior-art straining ring, which pretensions the edge area of the sealing bellows against the thrust ring.

To prevent the edge area of the sealing bellows from slipping away in the direction of the joint ball of the ball pivot and from thus becoming separated from the thrust ring, it is, furthermore, recommended that a ring shoulder be made in one piece with the axial shoulder of the thrust ring, i.e., to make the thrust ring in one piece with the axial shoulder. Furthermore, it is possible in the sense of the present invention to arrange a retaining ring between the thrust ring and a groove of the joint ball. The groove of the joint ball is located in the transition area between the pivot section of the ball pivot and the joint ball that is arranged or made in one piece therewith.

Corresponding to a variant, this retaining ring may, of course, be made in one piece with the thrust ring. The area in which the thrust ring is inserted for the edge area of the sealing bellows would correspondingly have a U-shaped cross section when viewed in the cross section, so that the edge area of the sealing bellows would be accommodated slidingly in the thrust ring and secured against axial slipping.

A preferred embodiment of a ball-and-socket joint according to the present invention for motor vehicles will be explained in greater detail below with reference to the corresponding drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawngs.

DESCRIPTION OF THE PREFERRED EMBODIMENT

Figure 1:
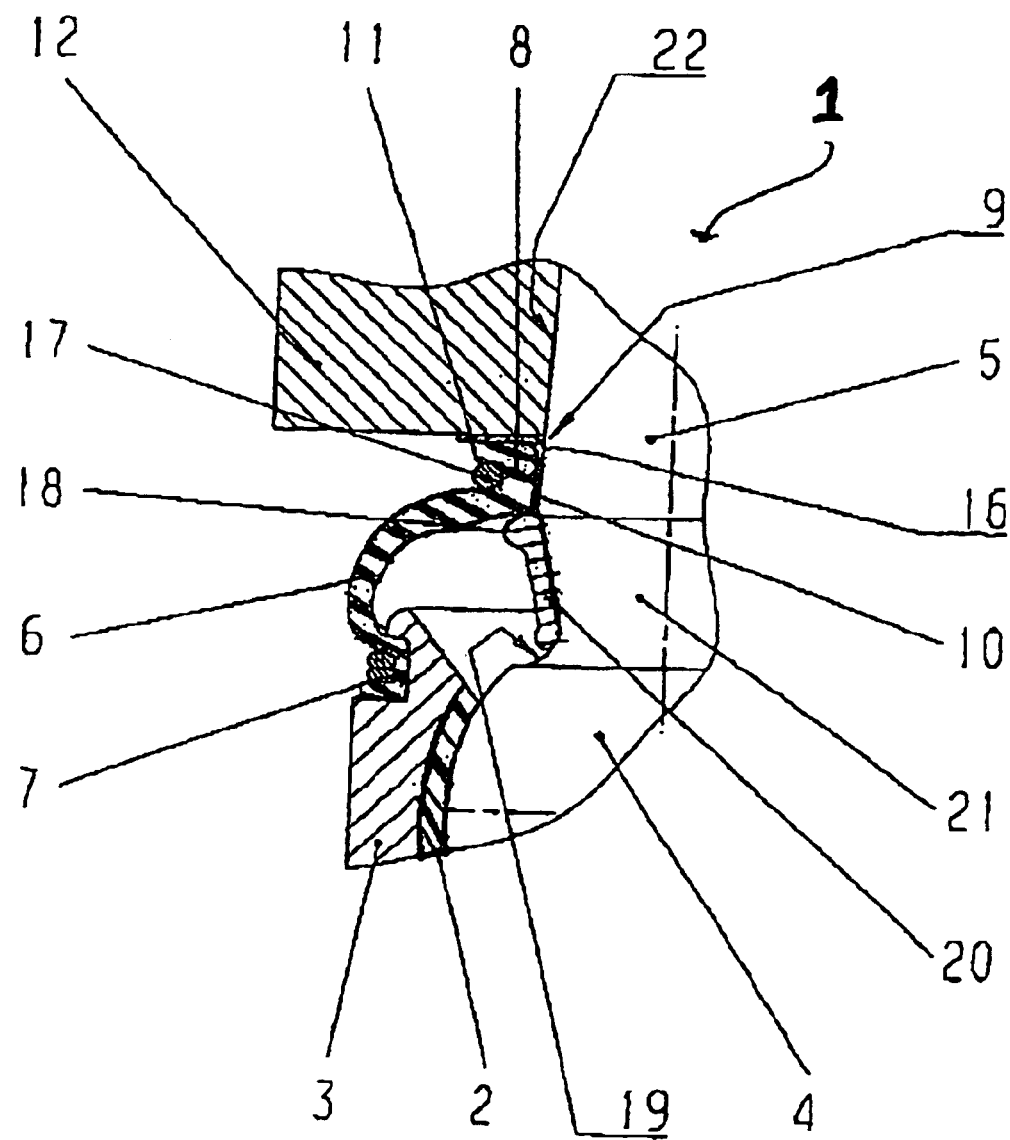
FIG. 1 is a sectional view of a detail of a ball-and-socket joint according to the present invention.

Referring to the drawings in particular, a preferred embodiment of a ball-and-socket joint according to the present invention is shown as an example. This comprises a ball pivot 1, whose joint ball 4 is accommodated rotatably and tiltably in a bearing shell 2 inserted into a housing 3 of the ball-and-socket joint. With its pivot section 5 provided on the ball pivot 1, the ball pivot 1 passes through an opening of a motor vehicle component 12. At its end, the ball pivot 1 has a threaded area, not shown in the figures, by means of which it can be fixed on the motor vehicle component 12. A sealing bellows 6 made preferably of rubber, which has two edges areas, is used to seal the inner joint components of the ball-and-socket joint. A first edge area 7 is fastened in a groove prepared in the housing 3. A straining ring is used in the known manner to sealingly fix the first edge area 7.

Opposite this first edge area 7, the sealing bellows 6 has a second edge area 8, which is accommodated in a thrust ring 9 fastened tightly on the ball pivot 1. A straining ring 17, which centripetally braces the edge area 8, is used to improve the contact of the second edge area 8 of the sealing bellows 6 on the thrust ring 9. The thrust ring 9 comprises an axial shoulder 10, which is fixed tightly on the pivot area 5 of the ball pivot 1, as well as a radial shoulder 11, which extends approximately at right angles to the axial shoulder in the view shown in FIG. 1, which shows the installed state in the motor vehicle. The radial shoulder 11 has a special shape. It has a wave shape beginning from the axial shoulder 10 when viewed in the radial direction. This wave shape comprises, as can be better recognized from FIGS. 2, 3 and 4, a first wave peak 13, which passes over into a wave valley 14 following it, which is followed by a second wave peak 15. Elastic contact of this radial shoulder 11 with the motor vehicle component 12 can be guaranteed by this wave-shaped design of the radial shoulder 11 of the thrust ring 9 with the ball-and-socket joint mounted. As a result, the sealing is substantially improved in this sensitive area of the joint compared with prior-art designs.

Figure 2:
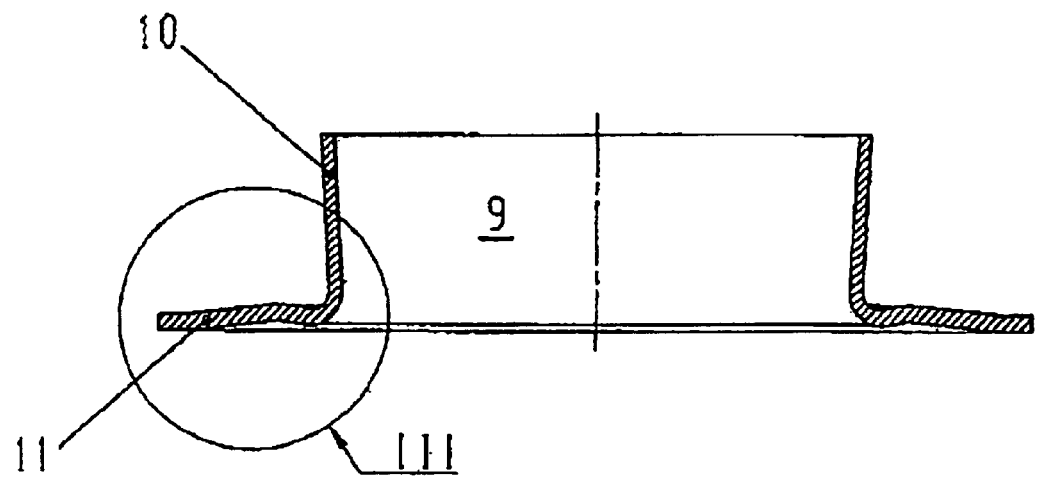
FIG. 2 is an individual sectional view of a thrust ring.

In the exemplary embodiment shown in FIG. 1, the thrust ring 9 is in contact with its axial shoulder 10 with the pivot section 5 of the ball pivot, which has a conical design here and thus forms a press fit with a corresponding conical recess 22 of the motor vehicle component 12. Due to the conical design of the pivot session 5 of the ball pivot 1, this is pulled captively into the mentioned recess 22 during mounting.

Furthermore, the sealing action of the edge area 8 of the sealing bellows 6 can be improved by the edge area having a labyrinth seal 16 on at least one side of its contact surfaces at the thrust ring 9. As is apparent from the enlarged view in FIG. 4, the labyrinth seal 16 of the edge area 8 is provided at the axial shoulder 10 of the thrust ring 9 in the exemplary embodiment shown in FIG. 1.

Due to the dynamic load on the sealing bellows 6 resulting from the movement of the ball pivot 1, there is an at least potential risk that the edge area 8 of the sealing bellows 6 migrates out of the thrust ring 9 in the axial direction toward the joint ball. To prevent this, a ring shoulder 18 is made in one piece with the thrust ring 9, as can be clearly recognized in FIG. 4. This ring shoulder 18 prevents the edge area 8 of the sealing bellows 6 from sliding off axially.

Figure 3:
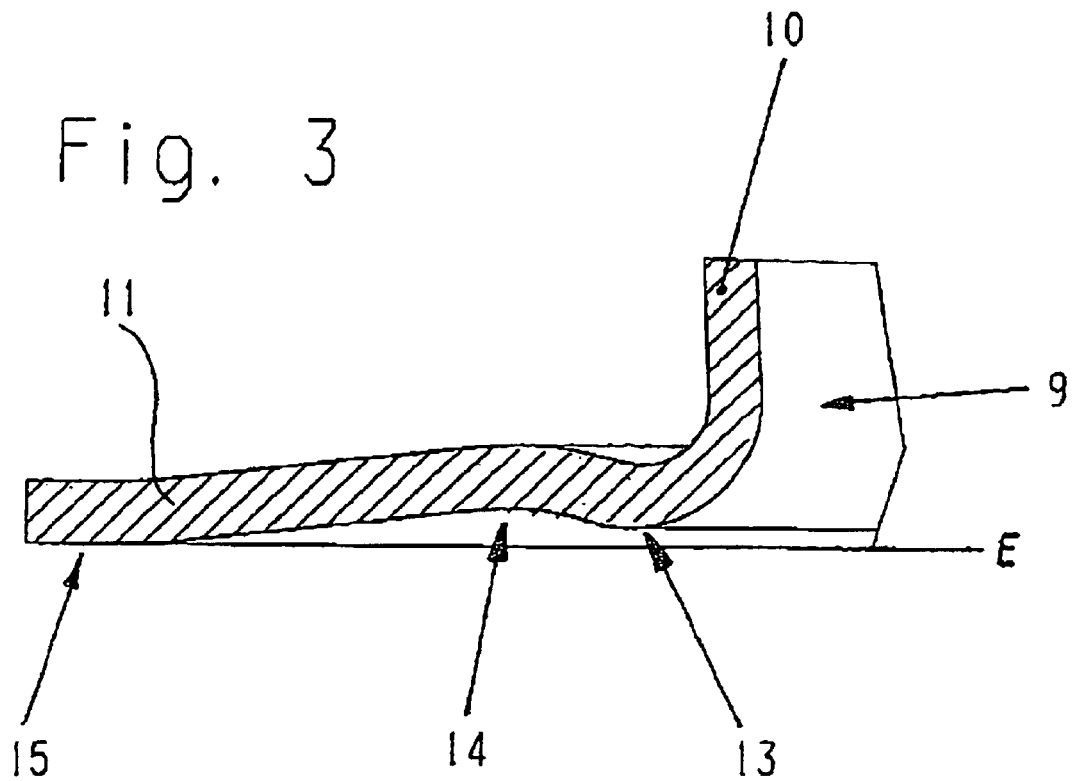
FIG. 3 is the enlarged view III of FIG. 2.
Figure 4:
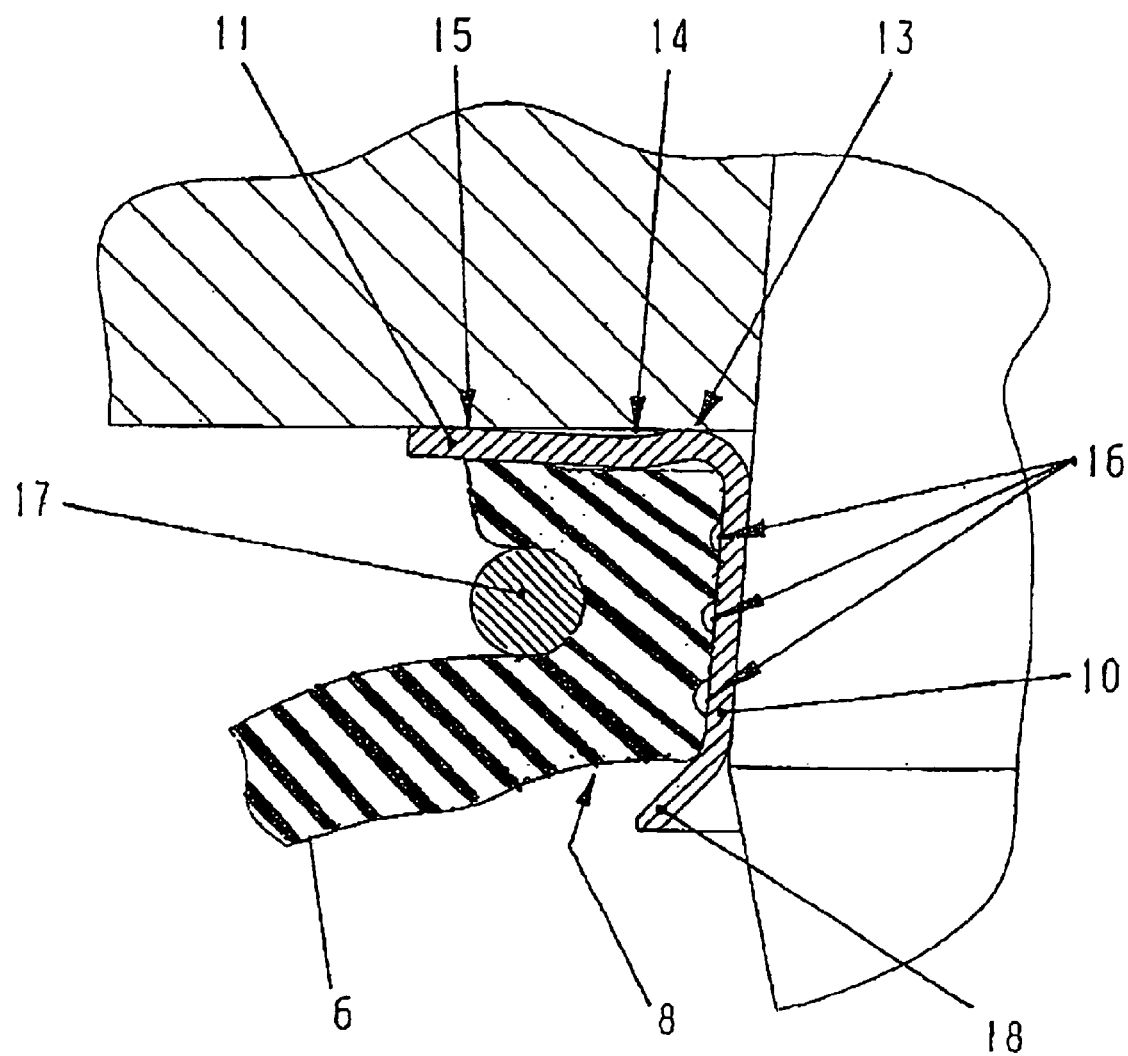
FIG. 4 is an enlarged detail of the thrust ring with an area of the sealing bellows.

In FIG. 3, the wave peaks 13 and 15 have different heights in relation to a common plane, the second wave peak 15 having a somewhat greater height than the first wave peak 13. As a result, it was possible to bring about an elasticity of the thrust ring 9 and especially its radial shoulder 11, which guarantees optimal sealing function in this area of the joint when the joint ball is installed in the motor vehicle component 12. The radial should 11 is normally in such a close contact with the surface of the motor vehicle component 12 in the installed state that the shape of the wave peaks 13 and 15 as well as the wave valley 14 comes close to a straight contact surface.

However, the axial excursion of the edge area 8 of the sealing bellows 6 from the thrust ring 9 can also be prevent by means of a retaining ring 20, which is arranged in a neck area 21 of the ball pivot 1. The retaining ring 20 is thus arranged between the end area of the thrust ring 9 and a groove 19 before the beginning of the joint ball 4 of the ball pivot 1.

As is also apparent from FIG. 1, a ring shoulder 18 is made in one piece with the retaining ring 20 in this case to prevent the edge area 8 of the sealing bellows 6 from moving out in the axial direction.

While a specific embodiment of the invention has been shown and described in detail to illustrate the application of the principles of the invention, it will be understood that the invention may be embodied otherwise without departing from such principles.

What is claimed is:

1. A ball-and-socket joint for motor vehicles, the ball-and-socket joint comprising:

a housing;

a bearing shell associated with said housing;

a ball pivot with at least a joint ball accommodated rotatably and/or pivotably in said bearing shell of said housing and with a pivot section;

a thrust ring fixed on said pivot section, said thrust ring comprising an axial shoulder and a radial shoulder, said radial shoulder having a wave-shaped contour; and a sealing bellows with a first edge area fastened to said housing and with a second edge area having a sliding connection with said thrust ring;

beginning from said axial shoulder in an axial direction, said radial shoulder of said thrust ring has a first wave peak, a wave valley following said first wave peak and a second wave peak following said wave valley, a shape of said wave peaks and said wave valley comes close to a straight contact surface, said first and second peaks each being in direct contact against a surface of a motor vehicle.

2. A ball-and-socket joint in accordance with claim 1, wherein said radial shoulder is elastically supported against a said surface of a motor vehicle component in an installed state of the ball-and-socket joint in the motor vehicle.

3. A ball-and-socket joint in accordance with claim 1, wherein said wave peaks have different heights relative to a common place with said first wave peak having a smaller height than said second wave peak.

4. A ball-and-socket joint in accordance with claim 1, wherein said thrust ring is made of a corrosion-resistant material.

5. A ball-and-socket joint in accordance with claim 1, wherein said second edge area of said sealing bellows has a labyrinth seal on at least one contact surface that is in contact with said thrust ring.

6. A ball-and-socket joint in accordance with claim 5, wherein:
said labyrinth seal is arranged in contact with said axial shoulder.

7. A ball-and-socket joint in accordance with claim 1, wherein said second edge area of said sealing bellows is pretensioned by means of a straining ring against said thrust ring.

8. A ball-and-socket joint in accordance with claim 1, wherein said ball-and-socket joint has an axial securing means at said thrust ring, said axial securing means comprising a ring shoulder made in one piece with said axial shoulder or a retaining ring arranged between said thrust ring and a groove of said joint ball with a ring shoulder made in one piece therewith.

9. A ball-and-socket joint in accordance with claim 8, wherein said retaining ring is made in one piece with said thrust ring.

10. A ball-and-socket joint in accordance with claim 1, wherein:
said radial shoulder has a thickness;
said wave peaks have different heights relative to a common plane, a difference between said heights being smaller than said thickness of said radial shoulder.

11. A ball-and-socket joint in accordance with claim 10, wherein:
a depth of said wave valley with respect to said wave peaks is less than said thickness of said radial shoulder.

12. A ball-and-socket joint and motor vehicle component comprising:
a vehicle component;
a housing;
a bearing shell associated with said housing;
a ball pivot with at least a joint ball accommodated rotatably and/or pivotably in said bearing shell of said housing and with a pivot section, one of said housing and said pivot section being connected to said vehicle component;
a thrust ring fixed on said pivot section, said thrust ring comprising an axial shoulder and a radial shoulder, said radial shoulder having a wave-shaped contour; and
a sealing bellows with a first edge area fastened to said housing and with a second edge area having a sliding connection with said thrust ring;
beginning from said axial shoulder in an axial direction, said radial shoulder of said thrust ring has a first wave peak, a wave valley following said first wave peak and a second wave peak following said wave valley, a shape of said wave peaks and said wave valley comes close to a straight contact surface, said first and second peaks each being in direct contact against a surface of a motor vehicle.

13. A ball-and-socket joint and vehicle component in accordance with claim 12, wherein said pivot section is connected to said vehicle component and said radial shoulder is elastically supported against a said surface of said motor vehicle component in an installed state of the ball-and-socket joint in the motor vehicle.

14. A ball-and-socket joint and vehicle component in accordance with claim 12, wherein said wave peaks have different heights relative to a common plane with said first wave peak having a smaller height than said second wave peak.

15. A ball-and-socket joint and vehicle component in accordance with claim 12, wherein said edge area of said sealing bellows has a labyrinth seal in contact with said axial shoulder of said thrust ring.

16. A ball-and-socket joint and motor vehicle component comprising:
a vehicle component;
a housing;
a bearing shell associated with said housing;
a ball pivot with at least a joint ball accommodated rotatably and/or pivotably in said bearing shell of said housing and with a pivot section, one of said housing and said pivot section being connected to said vehicle component;
a thrust ring fixed on said pivot section, said thrust ring comprising an axial shoulder and a radial shoulder, said radial shoulder having a wave-shaped contour; and
a sealing bellows with a first edge area fastened to said housing and with a second edge area having a sliding connection with said thrust ring;
beginning from said axial shoulder in an axial direction, said radial shoulder of said thrust ring has a first wave peak, a wave valley following said first wave peak and a second wave peak following said wave valley, said wave peaks having different heights relative to a common plane with said first wave peak having a smaller height than said second wave peak.

17. A ball-and-socket joint for motor vehicles, the ball-and-socket joint comprising:
a housing;
a bearing shell associated with said housing;
a ball pivot with at least a joint ball accommodated rotatably and/or pivotably in said bearing shell of said housing and with a pivot section;
a thrust ring fixed on said pivot section, said thrust ring comprising an axial shoulder and a radial shoulder, said radial shoulder having a wave-shaped contour; and
a sealing bellows with a first edge area fastened to said housing and with a second edge area having a sliding connection with said thrust ring;
beginning from said axial shoulder in an axial direction, said radial shoulder of said thrust ring has a first wave peak, a wave valley following said first wave peak and a second wave peak following said wave valley, said wave peaks having different heights relative to a common plane with said first wave peak having a smaller height than said second wave peak.

18. A ball-and-socket joint and motor vehicle component comprising:

a vehicle component;

a housing;

a bearing shell associated with said housing;

a ball pivot with at least a joint ball accommodated rotatably and/or pivotably in said bearing shell of said housing and with a pivot section, one of said housing and said pivot section being connected to said vehicle component;

a thrust ring fixed on said pivot section, said thrust ring comprising an axial shoulder and a radial shoulder, said radial shoulder having a wave-shaped contour; and a sealing bellows with a first edge area fastened to said housing and with a second edge area having a sliding connection with said thrust ring;

beginning from said axial shoulder in an axial direction, said radial shoulder of said thrust ring has a first wave peak, a wave valley following said first wave peak and a second wave peak following said wave valley, said first and second wave peaks each being arranged in direct contact with the vehicle component.

19. A ball-and-socket joint arrangement comprising:

a housing;

a bearing shell arranged in said housing;

a ball pivot including a joint ball and pivot section, said joint ball being pivotally arranged in said bearing shell of said housing;

a vehicle component connected to said pivot section;

a thrust ring on said pivot section, said thrust ring comprising an axial shoulder and a radial shoulder, said radial shoulder having a wave-shaped contour, and arranged on said pivot section, to be elastically biased against said vehicle component, said wave-shaped contour having separate first and second wave peaks separated by a wave valley, said first and second wave peaks each being in direct contact with, and biased against, said vehicle component;

a sealing bellows including a first edge area fastened to said housing and including a second edge area having a sliding connection with said thrust ring.

20. An arrangement in accordance with claim 19, wherein:

said second wave peak is more biased against said vehicle component than said first wave peak.

* * * * *